United States Patent [19]

Dragone

[11] Patent Number: 5,243,672
[45] Date of Patent: Sep. 7, 1993

[54] PLANAR WAVEGUIDE HAVING OPTIMIZED BEND

[75] Inventor: Corrado Dragone, Little Silver, N.J.

[73] Assignee: AT&T Bell Laboratories, Murray Hill, N.J.

[21] Appl. No.: 924,772

[22] Filed: Aug. 4, 1992

[51] Int. Cl.$^5$ ............................................. G02B 6/26
[52] U.S. Cl. ...................................... 385/46; 385/17; 385/37; 385/39
[58] Field of Search ................. 385/13, 27, 28, 32, 385/46, 17, 16, 37, 39, 42, 43, 44, 45

[56] References Cited

U.S. PATENT DOCUMENTS

| | | | |
|---|---|---|---|
| 4,993,794 | 2/1991 | Young et al. | 385/28 |
| 5,002,350 | 3/1991 | Dragone | 385/24 |
| 5,018,814 | 5/1991 | Jannson et al. | 385/28 |
| 5,093,884 | 3/1992 | Gidon et al. | 385/32 |
| 5,136,671 | 8/1992 | Dragone | 385/46 |

OTHER PUBLICATIONS

"Broadband Silica-Based Optical Waveguide Coupler with Asymmetric Structure" A. Takagi, et al. Electronic Letters, Jan. 18, 1990, No. 2, vol. 26, pp. 132–133.

*Primary Examiner*—Frank Gonzalez
*Attorney, Agent, or Firm*—Eli Weiss

[57] ABSTRACT

In an embodiment, an $N \times N$ integrated optical interconnection apparatus capable of switching, multiplexing or demultiplexing a large number of input and output wavelength channels achieves low levels of crosstalk and insertion loss. Two substantially identical $N \times M$ star couplers are connected by an optical diffraction grating comprising M unequal length waveguides spaced from one another by predetermined amounts. The waveguides of the grating consists of an array of curved waveguides of different lengths. The waveguides are closely spaced at their ends and widely spaced and strongly curved in the central region. The curves or bends of the planar waveguides here disclosed have sharper bends, lower losses and increased tolerance to fabrication defects. The improved bends are realized by selecting a width and radius of curvature for the waveguide which is large enough to force the fundamental mode of an optical signal to propagate away from the inner edge of the bend, thus causing negligible illumination of this edge. Moreover, the curvature of the bend is large enough to effectively cut off modes above the fundamental mode. In the new waveguide here disclosed, the mode propagation constant is effectively independent of the waveguide width thus avoiding prior art phase error problems caused by variations in the width of the waveguide.

11 Claims, 3 Drawing Sheets

PLANAR WAVEGUIDE HAVING OPTIMIZED BEND

FIELD OF THE INVENTION

This invention relates generally to planar waveguides used to carry optical signals between optical devices and/or between optical devices and other waveguides. More particularly, this invention relates to an improved bend in a planar waveguide which has a smaller radius, lower losses and increased tolerance to fabrication defects.

BACKGROUND OF THE INVENTION

Optical switching, multiplexing, and demultiplexing have been accomplished in the past by using an interconnection apparatus having a plurality of closely spaced input waveguides communicating with the input of a star coupler. The output of the star coupler communicates with a second star coupler via an optical grating consisting of an array of optical waveguides. Each of the waveguides differs in length with respect to its nearest neighbor by a predetermined fixed amount. The outputs of the second star coupler form the outputs of the switching, multiplexing, and demultiplexing apparatus. See, for example, my U.S. Pat. No. 5,002,350 issued Mar. 26, 1991.

In operation, when each of a plurality of separate and distinct wavelengths are launched into a separate and distinct input port of the apparatus, they will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port.

The grating located between the two star couplers essentially consists of an array of curved waveguides of different lengths. The waveguides are closely spaced at their ends, whereas they are widely spaced and strongly curved in the central region. The order of the grating is determined by the difference in length between adjacent waveguides. For many applications, the order of the grating must be large, normally greater than 50. As a result, the grating then becomes large and is difficult to make with satisfactory accuracy, particularly when very low levels of cross-talk are desired. Actually, defects of fabrication will, in general, cause waveguide width variations which will affect the propagation constant in each arm of the grating, thus causing phase errors that will substantially increase cross-talk in a multiplexer. In addition, to keep bend losses to a minimum, the radius of the waveguide bend is limited.

It is, therefore, an object of this invention to reduce phase errors in grating waveguides which result from fabrication variations. It is also an object of this invention to reduce the bend loss to allow the bend radius of the waveguide bend to be further decreased without further increasing bend losses.

SUMMARY OF THE INVENTION

This object is achieved by making the curvature of a planar waveguide to be as close to the critical value needed to insure that essentially only the fundamental mode propagates with the largest loss that can be tolerated. Also, the width of the planar waveguide is made sufficiently large to cause the fundamental mode of the optical signal to be displaced away from the inner edge of the curve and, therefore, to be concentrated along the outside edge of the curve. Thus, the fundamental mode effectively propagates in the vicinity of the outer edge of the bend and its propagation constant becomes effectively independent of the width of the waveguide. As a result, width variations of the planar waveguide caused by fabrication errors do not contribute to loss and, as the field intensity is small at the inner edge of the bend, negligible loss is caused by scattering from this edge.

DETAILED DESCRIPTION

Figure 1:
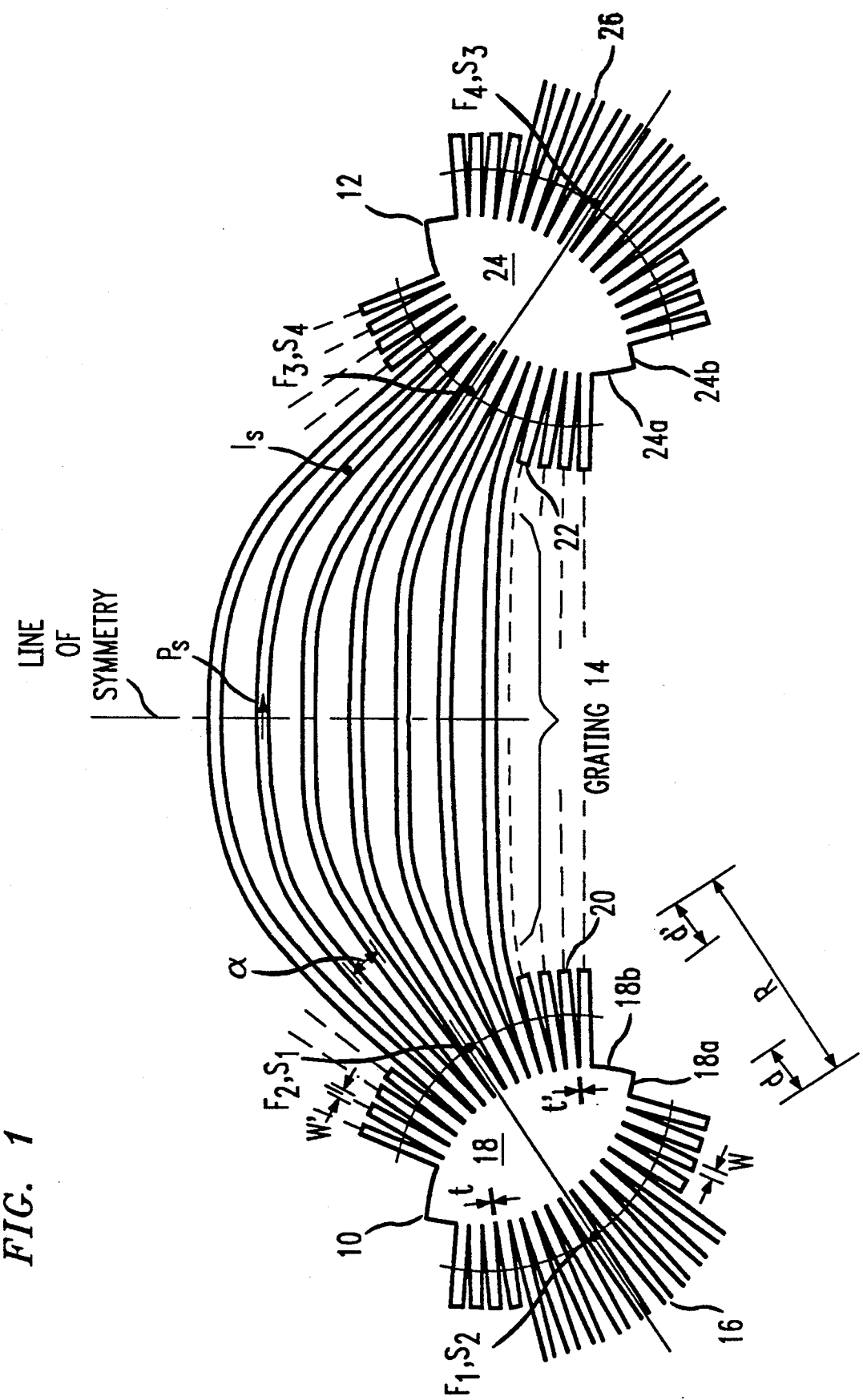
FIG. 1 illustrates an example of an integrated optical switching, multiplexing, and demultiplexing apparatus in which the invention can be used.

FIG. 1 shows an example of an optical interconnection apparatus which can be used as an optical switch, multiplexer, or demultiplexer in accordance with this invention. It preferably comprises two substantially identical and symmetrically disposed star couplers 10 and 12 connected by waveguides forming a substantially symmetrical optical diffraction grating 14.

In FIG. 1, an array 16 of N input waveguides are radially directed from N input ports toward a focal point F2. Each of the input waveguides has a predetermined width W and is angularly displaced from its adjacent waveguides by an angle $\alpha$.

The star coupler 10 comprises a dielectric slab 18 which forms a free space region having two curved, preferably circular, boundaries 18a and 18b. The input waveguides in the array 16 are connected to the free space region 18 in a substantially uniform fashion along boundary 18a. As indicated in FIG. 1, each of the waveguides is separated from its neighbor by a distance t along the boundary 18a.

An array 20 of M output waveguides is radially directed toward a focal point F1. Each of the waveguides in the array 20 has a width W' and is separated from adjacent waveguides in the array 20 by an angular spacing $\alpha'$. The output waveguides in the array 20 are connected to the free space region 18 in a substantially uniform fashion along boundary 18b. Each of the output waveguides is separated from its neighbors at the boundary 18b by a distance t', as shown in FIG. 1.

The M waveguides of the grating 14 are a symmetric arrangement of waveguides each having lengths $l_s$, where s is referenced to the central waveguide in the grating. Each half of the grating 14 comprises preferably three sections, respectively composed of radial, circular, and equispaced parallel waveguides. The total length of the $s^{th}$ waveguide is $$l_s = 2R_s(\theta_s - \sin\theta_s) + 2t_s(1 - \cos\theta_s) + h_o \qquad (1)$$

where $h_o$ is a constant and $R_s$ is the s-th radius of curvature.

Each of the output waveguides in the array 20 is connected to the input of a waveguide in the grating 14. The length of each waveguide in the grating differs from the lengths of all the other waveguides in the grating so that, in effect, predetermined and different phase shifts are applied to optical signals propagating into the waveguides of the grating from the star coupler 10 because of the different path lengths over which the signals in the grating must travel to reach the output of the grating. The outputs of the waveguides in the grating 14 thus have different phases, which are functions of the lengths of the waveguides.

The outputs of the waveguides in the grating 14 are connected to another array 22 of M input waveguides which are radially directed toward a focal point F4. The array 22 connects the output of the grating 14 to the input of the second star coupler 12. Like star coupler 10, star coupler 12 comprises a slab of dielectric material 24 forming a free space region having two curved, preferably circular, boundaries 24a and 24b. The array 22 of input waveguides is connected to the free space region in a substantially uniform distribution along boundary 24a.

An array 26 of N output waveguides are radially directed from N output ports toward a focal point F3. The output waveguides in the array 26 are connected to the free space region 24 in a substantially uniform distribution along the boundary 24b.

Phase errors caused by mutual coupling between neighboring waveguides in the arrays 16, 20, 22, and 26 cause increased crosstalk and reduced efficiency of power transfer in a device such as the device of FIG. 1. Accordingly, the focal points F1-F4 are located in the specific locations to minimize such phase errors. Specifically, focal point F1 is located at the phase center S2 of array 16, F2 is located at the phase center S1 of array 20, F3 is located at the phase center S4 of array 22, and F4 is located at the phase center S3 of array 26.

A phase center for an array of waveguides such as those arrays shown in FIG. 1 may be considered to be the center of a circle which most closely approximates a locus of points of equal phase for optical wavefronts emitted by the array when the array is excited from a particular input waveguide. In arrays such as those of FIG. 1 having a significant degree of mutual coupling between waveguides, the phase center generally is located outside the free space region a distance d away from the boundary of the free space region. The location of the phase center of an array of radially directed waveguides may be determined using the well known propagating beam method of computing the amplitudes and phases of radiation flowing from waveguides for any given excitation as a function of distance from the waveguides. Preferably, it is assumed that a central waveguide of one of the arrays is excited in the apparatus in FIG. 1. Assuming input excitation is applied to the central waveguide, namely, the waveguide directed through the focal point of the other array of waveguides connected to the same star coupler, the distance d is selected so as to minimize the variation in computed phase along some reference circle centered on that focal point. Various strategies may be adopted regarding this minimization. For example, d may be selected so as to reduce to zero as closely as possible the phase difference of the central waveguide and its two adjacent waveguides. Alternatively, one can select d so that the phase difference between the central and marginal waveguides is minimized. This alternative can be shown to minimize in general the peak value of the phase difference in the entire array.

Once d has been selected in this fashion, there still may be unacceptable residual phase errors across the array of waveguides. These may be reduced by appropriately selecting the length $l_s$ of the arms of the grating, which results in a grating having a nonconstant length difference $l_s - l_{s-1}$ throughout the grating.

The apparatus of FIG. 1 can be used as a switch, a multiplexer, or a demultiplexer. If optical power at a particular wavelength $\lambda_1$ is input to a particular input waveguide or input port in the array 16, the optical input power spreads in the free space region 18 and is distributed to the M waveguides in the grating 14 so that portions of the input optical power travel through each of the M waveguides. Those portions of the input optical power combine in free space region 24 in such a way that as much as possible of that power is concentrated on a desired point along the boundary 24b. This point is selected to be at a desired input of an output waveguide in the array 26 and thereby the input optical power is launched into that selected output waveguide. The location of this concentration of power, and the identity of the output waveguide to which input optical power is directed, is a function of the wavelength of input optical power. Thus, one can select which output waveguide the input power is directed toward by appropriately setting the wavelength of the input power. The identity of the output waveguide to which input power is directed is also a function of the identity of the input waveguide to which that input power is directed. The apparatus of FIG. 1 can thus switch input optical power from any of the N input waveguides to any of the N output waveguides in the case of a device having N input ports and N output ports.

Notice that the transmission coefficient of the apparatus of FIG. 1 is essentially a periodic function of input wavelength and, in a particular period, it has a single peak of transmission close to unity, produced from a particular input port to a particular output port. If the input and output waveguides are spaced arbitrarily, the apparatus of FIG. 1 is in general characterized in each period by $N^2$ distinct wavelengths of maximum transmission, since $N^2$ is the total number of transmission coefficients corresponding to the various input and output ports. The differences between these wavelengths are determined by the spacing of the input and output waveguides. It is important, for most applications, to choose uniform spacing, so as to cause the above $N^2$ wavelengths to essentially coalesce into N wavelengths $\lambda_1 \ldots, \lambda_N$ of maximum transmission in a particular period. In the following, the device will be assumed to be arranged in this preferred configuration.

If optical input power comprising a plurality of appropriate wavelengths $\lambda_1, \lambda_2, \ldots \lambda_N$ of maximum transmission is introduced simultaneously in one of the input waveguides, each of the wavelengths spreads in free space region of star coupler 10. Portions of the optical power are transmitted through the M waveguides of the grating 14 which then are combined in the free space region of star coupler 12. Optical power of each wavelength is concentrated at the inputs of different output waveguides. Each of the wavelengths of optical input power directed to a single input port is output by the device at different output ports. The device thus can act as a demultiplexer of the plurality wavelengths appearing on one of the input waveguides. The order in which wavelengths appear on the output waveguides is a function of which of the input waveguides carries the plurality of input wavelengths. The order thus can be different when the input wavelengths are directed to different input waveguide. The device of FIG. 1 thus may be used as an N×N demultiplexer in the case of a device having N input ports and N output ports.

As mentioned above, the device of FIG. 1 is symmetrical. Therefore, if optical input power at one of a plurality of different input wavelengths $\lambda_1, \lambda_2 \ldots \lambda_N$ is applied to each of the input waveguides, all of the wavelengths can be directed to a single output waveguide. The identity of the output waveguides is a function of the spatial order in which the input wavelengths are applied to the input waveguides and also a function of the magnitude of the wavelengths. The apparatus of FIG. 1 thus may be used as an N×N multiplexer in the case of a device having N input ports and N output ports.

Figure 2:
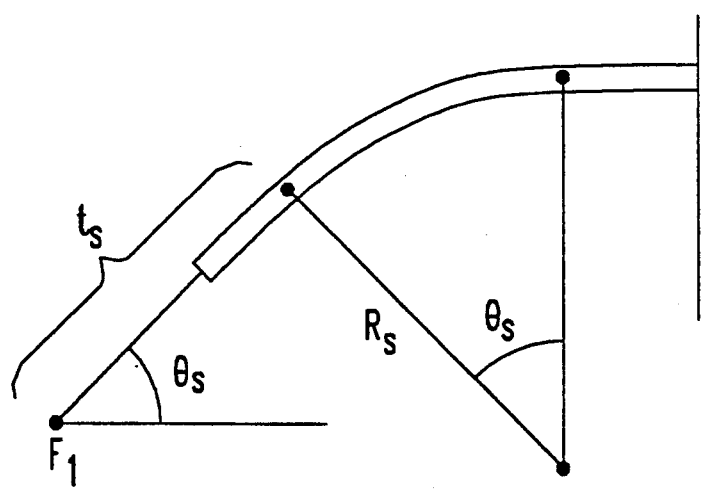
FIG. 2 depicts one-half of one of the waveguides in the optical grating shown in FIG. 1.

A wavelength-selective N×N integrated multiplexer which can simultaneously multiplex and demultiplex a large number of input and output channels as illustrated in FIGS. 1 and 2 is particularly suitable for realization in integrated form by using $SiO_2/Si$ technology. Specifically, the waveguides, star couplers, and optical grating comprise $SiO_2$ regions patterned on an Si substrate, for example, by photolithographic techniques.

Typically, the refractive index difference $\Delta n$ between the core and the cladding of each waveguide varies between 0.25 and 0.5%, but the effective difference $\Delta n_e$ is smaller, being between 0.17 and 0.35%. The reason for the smaller values is that the mode propagates partly outside the core region, and this is found to reduce the effective refractive difference. For a waveguide of large width, the reduction factor is determined by the fraction of the total power that propagates in the core relative to the total power, and this also gives approximately the reduction factor for a waveguide of finite width. Accurate procedures for determining $\Delta n_e$, taking into account the actual waveguide geometry, are well known, as shown for instance in "Guided-Wave Optoelectronics", edited by Tamir, Chapter 2 by H. Kogelnik, 1988, published by Springer Verlag.

In prior art devices of the type illustrated in FIGS. 1 and 2, a grating formed with $SiO_2/Si$ technology for typical values of $\Delta n$ of 0.25 and 0.5% supports planar waveguides having a radius of curvature which is about 10 mm or greater. A radius of curvature of less than 10 mm results in excessive signal loss at the bend. Additionally, the limitation on the minimum radius of curvature of the planar waveguides of the grating determines, to a large degree, the overall length of the optical grating and, therefore, the minimum spacing between the star couplers.

By contrast, a planar waveguide embodying the principles of the invention can have a low loss radius of curvature which is as small as 6 mm and increased tolerance to fabrication defects.

The new improved bends are realized by ensuring that the width and the curvature of the planar waveguide meet particular criteria. In particular, these parameters must be large enough to cause the fundamental mode of the optical signal to propagate away from the inner edge of the bend, thus causing negligible illumination of this edge. In addition, the curvature should be sufficiently large to effectively cut off higher order modes.

Figure 3:
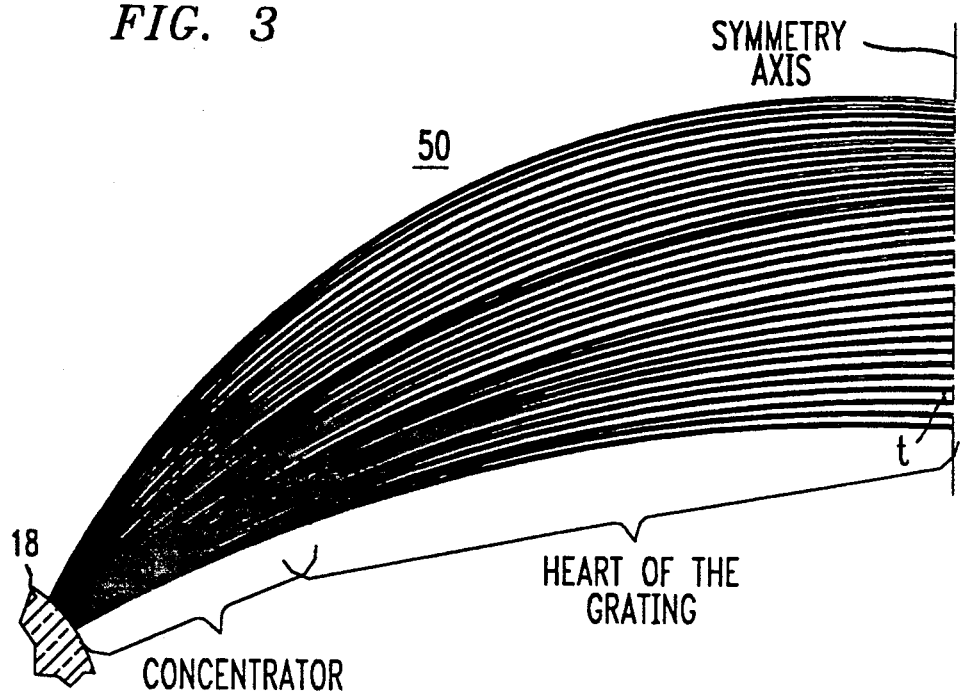
FIG. 3 illustrates in greater detail one-half of the optical grating of FIG. 1.

Referring to FIG. 3, there is illustrated one-half of a grating particularly suitable for use with N×N star couplers in accordance with the principles of the invention. The grating illustrated in FIG. 3 consists of an array of curved waveguides of different lengths positioned between two planar free-space regions formed by dielectric slabs 18, 24. At the circular boundary of slab 18, the waveguides are closely spaced, whereas they are widely spaced in the central region close to the symmetry axis. In this region, they are strongly curved, where each waveguide has approximately the same radius "R" of curvature.

The order of the grating is determined by the difference in length l between adjacent waveguides. More precisely, it is given by the relationship $$\frac{l}{\lambda} = \frac{S \cdot L}{\lambda R} \qquad (2)$$

where $\lambda$ is wavelength; S is the average spacing between two adjacent waveguides in the central regions of the grating; and L is the average length over which the two waveguides are effectively spaced by S.

For many applications, the order of the grating must be large, for instance, greater than 50. At an order value of 50, the grating becomes relatively large and is difficult to realize with satisfactory accuracy, particularly when very low levels of cross-talk is a requirement. In practice, defects of fabrication will, in general, cause waveguide width variations that will affect the propagation constant in each arm of the grating, thus causing phase errors that will substantially increase cross-talk in a multiplexer.

With this invention, these phase errors are reduced substantially by reducing the dependence of the propagation constant on the waveguide width. Additionally, with this invention the bend losses are reduced for a given R. Moreover, with this invention, the bend radius of the waveguide can be substantially reduced without increasing bend losses.

The smallest radius that can be chosen for a bend without causing appreciable loss is determined by the effective refractive difference $\Delta n_e$ between the core and cladding. For silica waveguides with $\Delta n \approx 0.25\%$, for example, the minimum radius is typically close to 50 mm. See, for example, *Electronics Letters*, Jan. 18, 1990, Vol. 26, No. 2, "Broadband Silica-Based Optical Waveguide Coupler With Asymmetric Structure" by A. Takagi et al. on pages 132–133.

With the invention here disclosed, this minimum radius of about 50 mm can be reduced by about a factor 1.6 without increasing bend loss. In general, the loss in a straight waveguide can be substantially decreased by increasing the width of the waveguide. But, the width cannot be arbitrarily large. To prevent unwanted modes, the width of the straight waveguide must be smaller than a critical value required to ensure that only the fundamental mode propagates. But, at this width, both side edges of the waveguide are strongly illuminated by the fundamental mode and appreciable losses are caused by scattering from rough edges which occur during the fabrication process. A similar situation arises when the waveguide is curved and, for this reason, the bend width is typically chosen to be smaller than the above noted critical value used for a straight waveguide.

In this invention, the bend performance of a planar waveguide is substantially improved by increasing the width of the planar waveguide as the radius of curvature is decreased. More specifically, the radius of curvature of the planar waveguide is fixed to be close to the critical value which corresponds to the largest loss that can be tolerated for the fundamental mode. At the same time, the width of the planar waveguide is set to allow the optical energy in the bend to be concentrated along the outer edge of the bend. Thus, stated differently, the optical energy in the bend is displaced away from the inner edge of the bend. The fundamental mode effectively propagates in the vicinity of the outer edge of the bend, and its propagation constant becomes effectively independent of the width of the waveguide. As a result, width variations of the planar waveguide which are caused by fabrication errors do not contribute to loss. Moreover, as the field intensity is small at the inner edge, negligible loss is caused by scattering from this edge.

Since bend losses are essentially independent of the bend width, the bend radius can be selected to be close to the critical value which is determined by the largest loss that can be tolerated for the fundamental mode.

In prior art bends of planar waveguides, this is not practical because the loss is strongly dependent on the waveguide width and, therefore, very precise fabrication is required to ensure that the critical loss is not exceeded.

A bend in a planar waveguide designed in accordance with the principles of the invention effectively supports with negligible loss only the fundamental mode when the waveguide width w is equal to or greater than:

$$w \geq \frac{2.8\lambda}{\pi} \cdot \frac{1}{\sqrt{\frac{2\Delta n_e}{n}}} \quad (3)$$

where n is the refractive index; and R, the radius of curvature is equal to or smaller than the specific value $$R < \frac{\lambda}{\pi} \frac{5.5^{1.5}}{\left(\frac{2\Delta n_e}{n}\right)^{1.5}} \quad (4)$$

This will cause the lowest order asymmetric mode to suffer losses in excess of 10 dB/radian in all cases of practical interest, when the width w is chosen in accordance with relationship (3). Moreover, the inner edge illumination will be appreciably lower, by approximately 3dB than the outer edge illumination. In practice, a larger w should be chosen, if possible, as this will further reduce the inner edge illumination.

Figure 4:
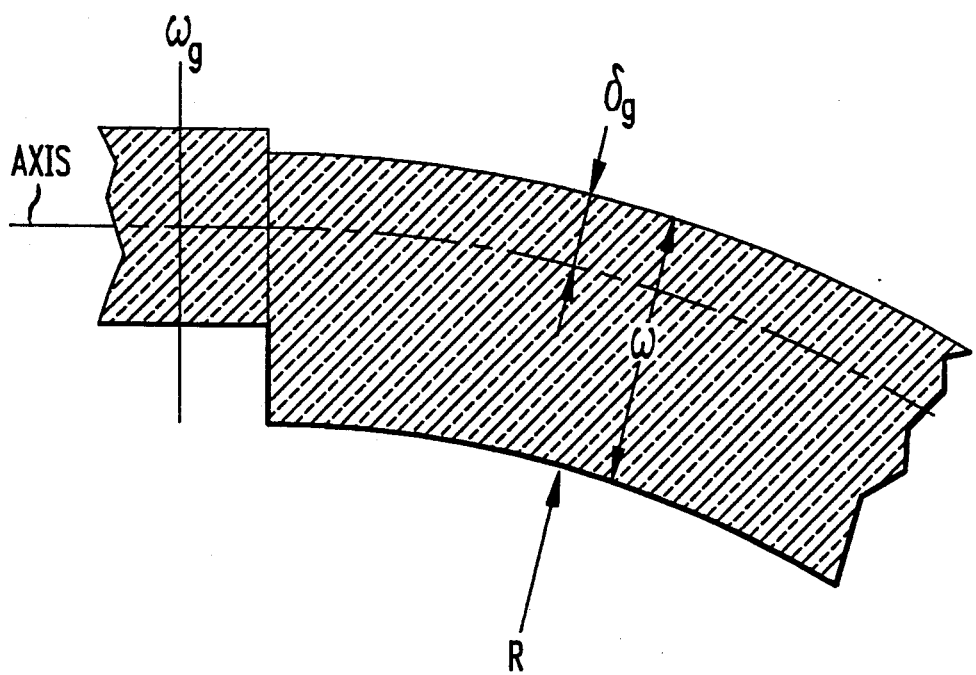
FIG. 4 illustrates the coupling relationship of the straight waveguide with the bend of a planar waveguide in accordance with the principles of the invention.

When the above conditions are satisfied, the fundamental mode is reasonably small and the bend can be connected, with negligible loss, to a straight waveguide having a width $w_g$ where $$w_g = \frac{\lambda}{2\pi} \left(\frac{2}{kR}\right)^{\frac{1}{2}} \left[3.3381 - \frac{1}{\left(\frac{2\Delta n_e}{n}\right)^{\frac{1}{2}}\left(\frac{kR}{2}\right)^{\frac{1}{2}}}\right] \quad (5)$$

where
$k = 2(\pi/\lambda)$
$\lambda$ = wavelength of the waveguide
R = radius of curvature of the waveguide
$\Delta n_e$ = effective refractive index difference Substantially 98 percent of the optical energy in the straight waveguide will be transferred to the planar waveguide bend provided the axis of the straight waveguide is properly aligned with the bend mode by displacing the axis of the straight waveguide from the outside bend edge as illustrated in FIG. 4. The displacement $\delta_g$ is given by $$\delta_g = \frac{\lambda}{2\pi} \left(\frac{kR}{2}\right)^{\frac{1}{2}} \left[1.425 - \frac{1}{\left(\frac{2\Delta n_e}{n}\right)^{\frac{1}{2}}\left(\frac{kR}{2}\right)^{\frac{1}{2}}}\right] \quad (6)$$

and both, $w_g$ and $\delta_g$ can deviate from the above optimum values by as much as 10%, without causing substantial decrease in efficiency, as is well known to those skilled in the art. In practice, in the design of the arrangement illustrated in FIGS. 1 and 3, the gap t between adjacent waveguides should be sufficiently wide so that there is only negligible coupling between their fundamental modes. To obtain this negligible coupling in the region where the waveguide width w is greater than 2.8, $$kt < \left(\frac{kR}{2}\right)\left(\frac{2\Delta n_e}{n}\right) - 1.8\left(\frac{kR}{2}\right)^{\frac{1}{2}} \quad (7)$$

where
$k = 2(\pi/\lambda)$
in the region with w being given by the above expression.

It will thus be appreciated that those skilled in the art will be able to devise numerous arrangements which, although not explicitly shown or described herein, embody the principles of the invention. Accordingly, all such alternatives, modifications and variations which fall within the spirit and broad scope of the appended claims will be embraced by the principles of the invention.

I claim:
1. An optical interconnection apparatus comprising:
a first plurality of input waveguides radially directed from a plurality of input ports toward a first focal point;
a first star coupler having an input connected to the plurality of input waveguides;
a first plurality of output waveguides radially directed to a second focal point and connected to an output of the first star coupler;
an optical grating comprising a plurality of unequal length waveguides having inputs connected to the first plurality of output waveguides;
a second plurality of input waveguides radially directed to a third focal point and connected to outputs of the optical grating;
said waveguides of said optical grating have a width w which is not less than

$$\frac{2.8\lambda}{\pi} \frac{1}{\sqrt{\frac{2\Delta n_e}{n}}}$$

where:

λ is the wavelength of the fundamental mode of the signal in the waveguide n is the effective refractive index of the core of the waveguide; and $\Delta n_e$ is the effective refractive index difference between the core and the cladding; and a bend, the radius of which is sized to effectively cut off modes above the fundamental mode of an optical signal therein;

a second star coupler having an input connected to an output of the second plurality of input waveguides; and a second plurality of output waveguides radially directed from a plurality of output ports toward a fourth focal point and connected to an output of the second star coupler;

the first and second focal points being located predetermined distances from the first star coupler and the third and fourth focal points being located predetermined distances from the second star coupler.

2. The optical interconnection apparatus of claim 1 wherein said bend has a radius of curvature R which is not greater than $$R < \frac{\lambda}{\pi} \frac{5.5^{1.5}}{\left(\frac{2\Delta n_e}{n}\right)^{1.5}}$$

where:

λ is the wavelength of the fundamental mode of the signal in the waveguide n is the effective refractive index of the core of the waveguide; and $\Delta n_e$ is the effective refractive index difference between the core and the cladding.

3. The optical interconnection apparatus of claim 2 wherein said unequal length waveguides of said grating are planar waveguides.

4. The optical interconnection apparatus of claim 2 wherein the bend in the waveguide has a radius which causes a loss in the bend due to tunneling to exceed 0.01 dB/radian.

5. The optical interconnection apparatus of claim 2 wherein the bend in the waveguide is butt coupled to a straight waveguide, the axis of the straight waveguide being aligned with the bend mode.

6. The optical interconnection apparatus of claim 5 wherein the axis of the straight waveguide is displaced from the outside edge of the waveguide with the bend by the distance $\delta_g$ where $$\delta_g = \frac{\lambda}{2\pi}\left(\frac{kR}{2}\right)^{\frac{1}{3}}\left[1.425 - \frac{1}{\left(\frac{2\Delta n_e}{n}\right)^{\frac{1}{3}}\left(\frac{kR}{2}\right)^{\frac{1}{3}}}\right]$$

where

R is the radius of the bend, n is the refractive index of the core $\Delta n_e$ is the refractive difference between the core and the cladding;

λ is waveguide wavelength; and $k = 2\pi/\lambda = 6.283/\lambda$.

7. The optical interconnection apparatus of claim 3 wherein said waveguides of the grating are planar waveguides.

8. A planar waveguide for conducting an optical signal along a curved path, the width of the curve path being large enough to cause the fundamental mode of the optical signal to be displaced from the inner edge of the curved path, and the curvature of the curved path being sufficiently large to effectively cut off modes above the fundamental mode of the optical signal.

9. The planar waveguide of claim 8 wherein the planar waveguide has a width which is equal to or greater than $$\frac{\lambda}{\pi} \frac{1}{\sqrt{\frac{2\Delta n_e}{n}}}$$

where

λ is a waveguide wavelength, n is the refractive index of the core, and $\Delta n_e$ is the effective refractive index between the core and the cladding.

10. The planar waveguide of claim 9 wherein the curved path has a radius which is equal to or smaller than $$\frac{\lambda 5.5^{1.5}}{\pi\left(\frac{2\Delta n_e}{n}\right)^{1.5}}$$

where

λ is the wavelength of the waveguide, n is the refractive index of the core; and $\Delta n_e$ is the effective refractive index between the core and the cladding.

11. A method of coupling a straight waveguide to a curved planar waveguide comprising the steps of determining the distance $\delta_g$ of the bend mode of the curved planar waveguide from the outside curved edge of the planar waveguide where $$\delta_g = \frac{\lambda}{2\pi}\left(\frac{2}{kR}\right)^{\frac{1}{3}}\left[1.32 - \frac{1}{\left(\frac{2\Delta n_e}{n}\right)^{\frac{1}{3}}\left(\frac{kR}{2}\right)^{\frac{1}{3}}}\right]$$

where

λ is the wavelength of the waveguide, n is the refractive index of the core, $\Delta n_e$ is the effective refractive index between the core and the cladding; and k equals $2(\pi/\lambda,)$ and aligning the axis of the straight waveguide with the bend mode of the curved planar waveguide.

* * * * *